United States Patent

[11] 3,627,348

| [72] | Inventor | Gerard T. Klees<br>Rochester, Mich. |
|---|---|---|
| [21] | Appl. No. | 47,421 |
| [22] | Filed | June 18, 1970 |
| [45] | Patented | Dec. 14, 1971 |
| [73] | Assignee | General Motors Corporation<br>Detroit, Mich. |

[54] LEVELING UNIT WITH INTEGRAL MOTOR-DRIVEN FLUID PUMP
3 Claims, 10 Drawing Figs.

[52] U.S. Cl. .................................................. 280/124, 267/65 D
[51] Int. Cl. .......................................................... B60g 17/08
[50] Field of Search ............................................ 280/124 F, 6, 6.1; 267/65

[56] References Cited
UNITED STATES PATENTS 3,445,122 5/1969 Cadiou .................. 280/124 F X
3,508,585 4/1970 Kurichh .................. 280/124 F X

*Primary Examiner*—Philip Goodman
*Attorneys*—William S. Pettigrew, J. C. Evans and K. H. MacLean, Jr.

ABSTRACT: In preferred form, a combination shock absorber and self-leveling unit for automotive suspension systems including an integral electric motor-driven fluid pump which draws hydraulic fluid from the shock absorber's reservoir chamber, pressurizes it and transfers it to a high-pressure booster chamber connected to the shock absorber's compression chamber where it produces a force on the piston rod area. A height-sensing device which energizes the pump motor has a laterally deflectable cantilevered arm supported at one end by a flexible tube and whose other end is free to contact a cammed surface on the shock absorber piston rod. Lateral movement of the lever by the action of the cammed surface actuates an electrical switch to energize the electric pump motor when in one operative position and opens a bleed valve when in another operative position.

PATENTED DEC 14 1971

INVENTOR.
Gerard J. Klees
BY
K. H. MacLean, Jr.
ATTORNEY

LEVELING UNIT WITH INTEGRAL MOTOR-DRIVEN FLUID PUMP

This invention relates to combination shock absorber and self-leveling units for automotive suspension systems.

When heavy loads are imposed on the sprung mass of an automobile, its main suspension springs are compressed. Excessive contraction of these springs is undesirable because it may adversely affect the riding quality of the automobile. Excessive loading and resultant spring contraction may also cause the automobile's body to assume an undesirably low position with respect to the road.

The subject shock absorber and self-leveling unit is adapted to supplement the normal suspension of the automobile body with relation to the axle whenever the vehicle is heavily loaded. This counteracts otherwise undesirable lowering of the vehicle body with respect to the road. The unit utilizes an electric motor-driven pump to pressurize hydraulic fluid which is drawn from the shock absorber reservoir chamber. The pressurized hydraulic fluid acts against the cross-sectional area of the shock absorber's piston rod to produce an upward force on the vehicle body when supplemental suspension is desirable.

A height-sensing device actuates an electrical switch to energize the pump motor when in one operative position and opens a bleed valve when in another operative position. More particularly, the height-sensing device includes an upstanding lever attached at its lower end by a flexible tube to the shock absorber and coactive at its upper free end with a cammed surface on the shock absorber piston rod which laterally deflects the lever. When the piston rod moves downward in response to increased loading of the automobile, the cammed surface pivots the lever about the supporting tube which actuates a pump motor switch for resultant pressurization of the shock absorber compression chamber. When the piston rod moves upward away from the free end of the lever, in response to decreased loading of the automobile, a bleed valve is opened from the shock absorber compression chamber to the reservoir chamber to depressurize the compression chamber.

The use of an electric motor-driven fluid pump for automobile leveling is advantageous over methods used in prior combination shock absorber and self-leveling units. In those prior units, the relative movement of the piston in the shock absorber is utilized to pressurize hydraulic fluid for vehicles leveling. This may produce undesirable forces on the automobile suspension which affects the ride. Another undesirable feature of prior units is the necessity of vehicle movement before any leveling is achieved. In contrast, the subject combination shock absorber and self-leveling unit maintains a predetermined desirable distance between the sprung and unsprung masses of the vehicle without the necessity of vehicle movement. Because the fluid pump is actuated by an electric motor, there are no undesirable forces to cause undesirable affects on the vehicle ride.

Therefore, an object of the inventor in the present invention is to provide an integral combination shock absorber and self-leveling unit for automotive suspension systems which includes an electric motor-driven fluid pump to pressurize hydraulic fluid for vehicle leveling.

A further object of the inventor in the present invention is to provide an integral combination shock absorber and self-leveling unit for automotive suspension systems which has an electric motor-driven fluid pump for pressurizing and transferring hydraulic fluid to the shock absorber compression chamber for vehicle leveling in response to a height-sensing device which includes a laterally deflectable cantilevered lever supported at one end by a flexible tube attached to the shock absorber and coactive at its free end with a cammed surface on the shock absorber piston rod.

A still further object of the inventor in the present invention is to provide an integral combination shock absorber and self-leveling unit for automotive suspension systems which has an electric motor-driven fluid pump for pressurizing and directing hydraulic fluid against the cross-sectional area of the shock absorber piston rod in response to a height-sensing device.

Further objects and advantages of the present invention will be apparent from the following description, reference being had to the accompanying drawings wherein a preferred embodiment of the present invention is clearly shown. In The Drawings.

Figure 1:
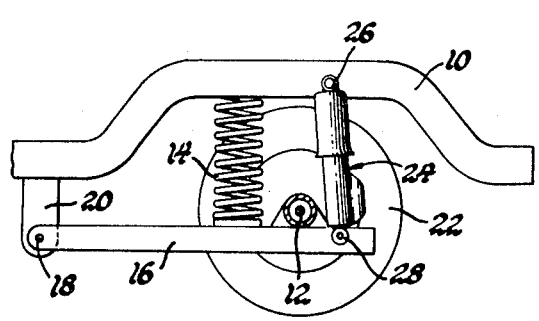
FIG. 1 is a fragmentary view in side elevation of an automobile frame and axle with the combination shock absorber and self-leveling unit of the present invention.
Figure 3:
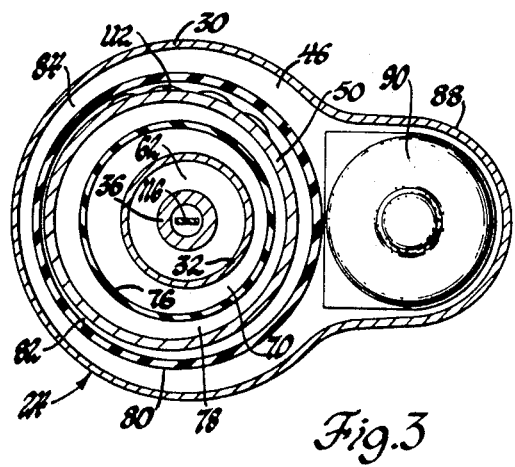
FIG. 3 is a horizontal-sectioned view taken along section line 3—3 in FIG. 2.

In FIG. 1 of the drawings, a body-supporting frame 10 of an automobile is shown suspended with respect to an axle 12 by a main suspension coil spring 14. Spring 14 extends between the frame 10 and a control arm 16 which is pivoted about a pin 18. Pin 18 is attached to a bracket 20 on frame 10. The axle 12 extends between wheels 22 (only one of which is shown) and is rigidly secured adjacent the wheels to the free end of the control arms 16 (only one of which is shown). An integral combination shock absorber and self-leveling unit 24 is attached at an upper end 26 to the frame 10 and at a lower end 28 to the control arm 16. The suspension spring 14 and the unit 24 coact to support frame 10 on axle 12.

The details of unit 24 are more particularly illustrated in FIGS. 2–6. Unit 24 includes a cylindrical member 30 adapted to be attached to the unsprung mass or axle of the automobile. A pressure cylinder tube 32 is supported within the member 30. The upper end of member 30 is attached to an end member 34 having a bore 38 through which a piston rod 36 extends coaxially into the pressure cylinder tube 32. An annular piston rod seal 40 encircles the piston rod 36 and is biased against end member 34 by a spring 42 to block leakage of hydraulic fluid therebetween. A fitting 44 is attached to the upper end of the piston rod 36 and is adapted to secure the piston rod 36 to frame 10 of the automobile. A generally cup-shaped dust cover 45 is attached to piston rod 36 and covers the upper end of unit 24 to prevent the entry of dirt between the piston rod 36 and member 34.

The lower end of the cylindrical member 30 is attached to a base member 46 which has a fitting 48 adapted to attach the unit 24 to axle 12 of the automobile. A second cylindrical member 50 is supported within the cylindrical member 30 and around the pressure cylinder tube 32. The lower end of cylinder 50 is supported by the base member 46. The upper end of cylinder 50 is crimped to an end member 52 which encircles the piston rod 36 and is axially retained by the end member 34. The upper end of the pressure cylinder tube 32 is supported by an end member 54 which encircles the piston rod 36 and is axially retained by the members 34 and 52. A second piston rod seal 56 encircles piston rod 36 and is supported between end members 52 and 54. The lower end of pressure cylinder tube 32 is supported by a base member 58 which rests within a recess in the end cap 46.

The lower end of piston rod 36 is fastened to a piston 60 which is free to reciprocate within the pressure cylinder tube 32. The piston 60 divides the pressure cylinder tube 32 into a rebound chamber 62 and a compression chamber 64. An annular sealing ring 66 around the periphery of piston 60 prevents fluid leakage between rebound chamber 62 and compression chamber 64 as the piston reciprocates within the pressure cylinder tube. Two sets of valves 65 and 67 within piston 60 regulate the flow of hydraulic fluid between the rebound chamber 62 and the compression chamber 64 to produce a predetermined dampening action as the piston 60 reciprocates within the pressure cylinder tube 32.

The compression chamber 64 is connected by a passage 68 within the base member 58 to a hydraulic fluid filled booster chamber 70 located between the cylinder 50 and the pressure cylinder tube 32. A compression relief valve 71 regulates the fluid flow between the compression chamber 64 and the booster chamber 70. Another passage 72 within the base member 58 extends between the compression chamber 64 and the booster chamber 70. An annular rebound relief valve 74 regulates the fluid flow through the passage 72.

The booster chamber 70 is formed around the pressure cylinder tube by an annular resilient bladder 76 whose upper and lower ends are sealed to the upper and lower ends of the cylinder 50. The annular space between the bladder 76 and cylinder 50 provides an expansion chamber 78 which is filled with a gas such as nitrogen.

When the piston 60 and piston rod 36 move upward within the pressure cylinder tube 32, hydraulic fluid flows through the piston 60 from rebound chamber 62 to compression chamber 64. Because of the volume of piston rod 36, the increase in compression chamber volume is greater than the decrease in rebound chamber volume. Makeup fluid flows from the booster chamber 70 through passage 72 and past the rebound relief valve 74 into the compression chamber 64. When the piston 60 and piston rod 36 move downward within the pressure cylinder tube 32, the decrease in compression chamber volume is greater than the increase in rebound chamber volume. Hydraulic fluid therefore flows from compression chamber 64 through passage 68 and past the compression relief valve 69 into the booster chamber 70.

The annular space between cylinder 30 and cylinder 50 is divided by an annular resilient bladder 80 which is attached at its upper and lower ends to the upper and lower ends of cylinder 30. Bladder 80 forms a hydraulic fluid-filled reservoir chamber 82 around the cylinder 50. The annular space between cylinder 30 and the bladder 80 is filled with a gas such as nitrogen to form an expansion chamber 84.

Automatic self-leveling of the unit 24 is provided by the introduction of pressurized hydraulic fluid into compression chamber 64 where it acts against the cross-sectional area of piston rod 36 to develop an upward force thereon to provide supplemental suspension. The hydraulic fluid is pressurized by a small gear-type pump 86 (see FIGS. 4 and 6) mounted on the end cap 46 within the expansion chamber 84 formed by a protruding portion 88 of cylinder 30. The gear pump 86 is driven by a small DC electric motor 90 within portion 88. The leads of motor 90 are connected to terminals 92 which extend through the outer cylinder.

Figure 4:
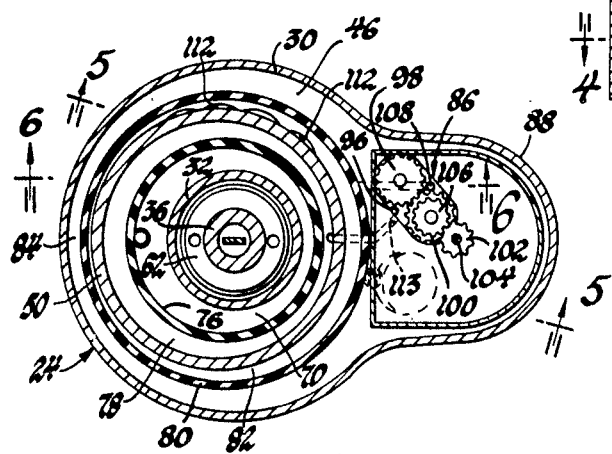
FIG. 4 is a horizontal-sectioned view taken along section line 4—4 in FIG. 2.
Figure 6:
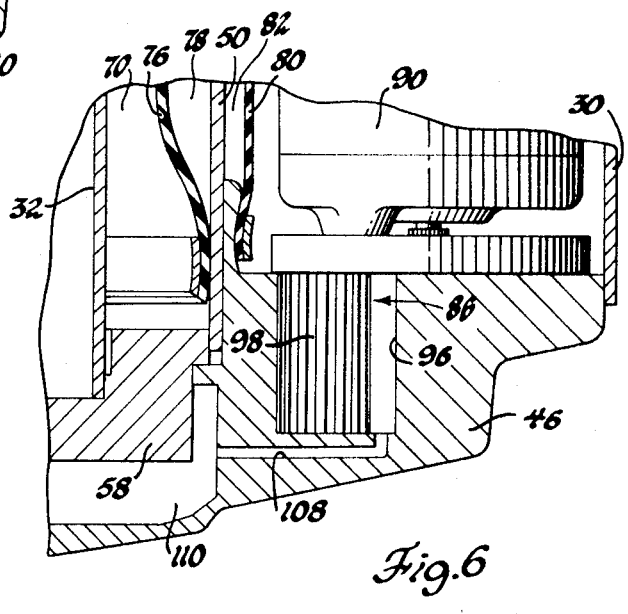
FIG. 6 is a vertical-sectioned view taken along section line 6—6 in FIG. 4.
Figure 7:
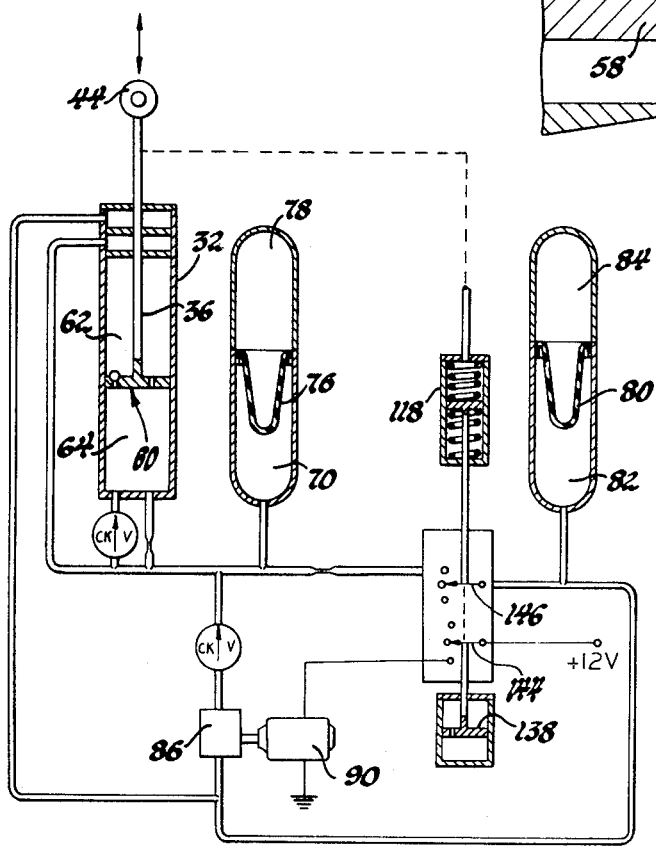
FIG. 7 is a schematic diagram of the fluid and electric systems of the subject shock absorber and self-leveling unit.

The pump 86 shown in detail in FIGS. 4 and 6 includes the base member 46 with a cavity 96. Two gear impellers 98 and 100 are supported for rotation within the cavity 96 and are driven by a gear 102 attached to the motor shaft 104 of motor 90 and another gear 106. An inlet passage 108 within the end cap 46 extends to a space 110 which is between the end cap 46 and the base member 58. The space 110 is fluidly connected to reservoir chamber 82 by passages 112 in the end cap 46. Thus, the pump 86 draws hydraulic fluid from the reservoir chamber 82, through passages 112, through space 110, through the inlet passage 108 and into the pump 86. A pump outlet passage 113 extends from the pump 86 through the end cap 46, the base member 58 into the compression chamber 64. When motor 90 is energized, the pump 86 draws hydraulic fluid from the reservoir chamber 82, pressurizes the hydraulic fluid and transfers the fluid into the compression chamber 64. The pressurized hydraulic fluid within compression chamber 64 acts upward against the cross-sectional area of the piston rod 36 and produces an upward force which tends to level the associated automobile.

Figure 2:
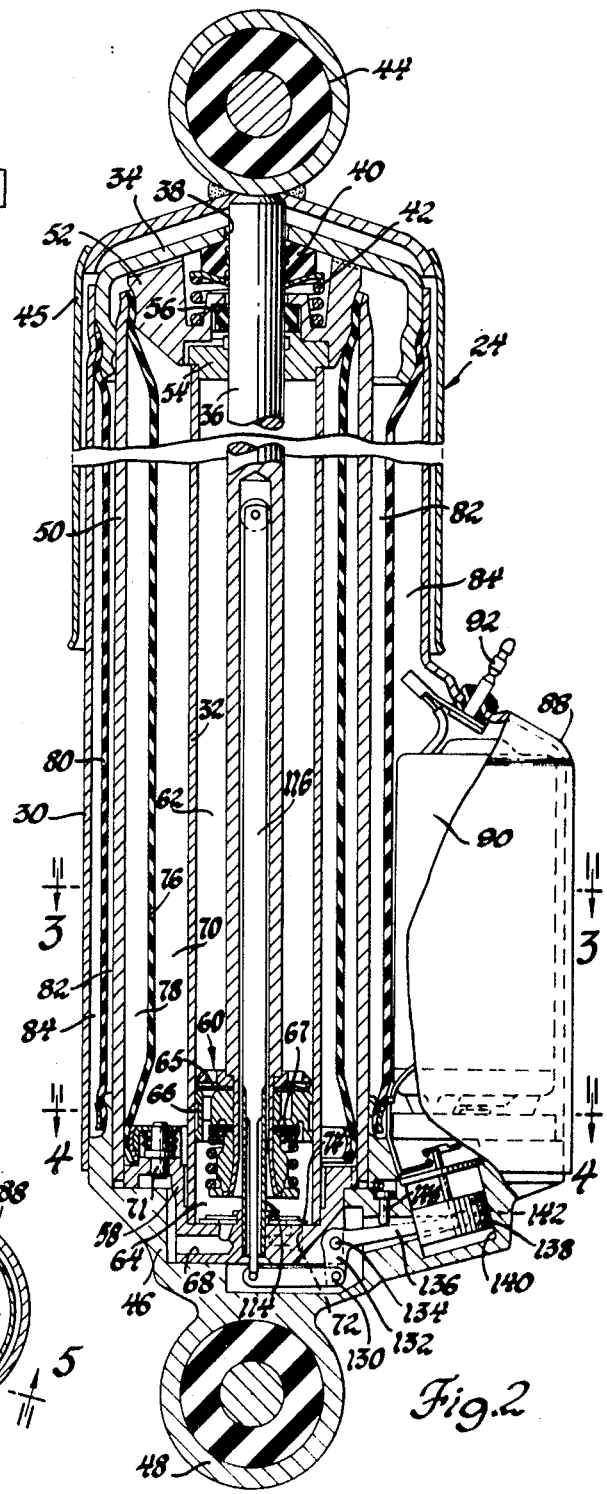
FIG. 2 is a vertical sectioned view of the combination shock absorber and self-leveling unit shown in FIG. 1.
Figure 5:
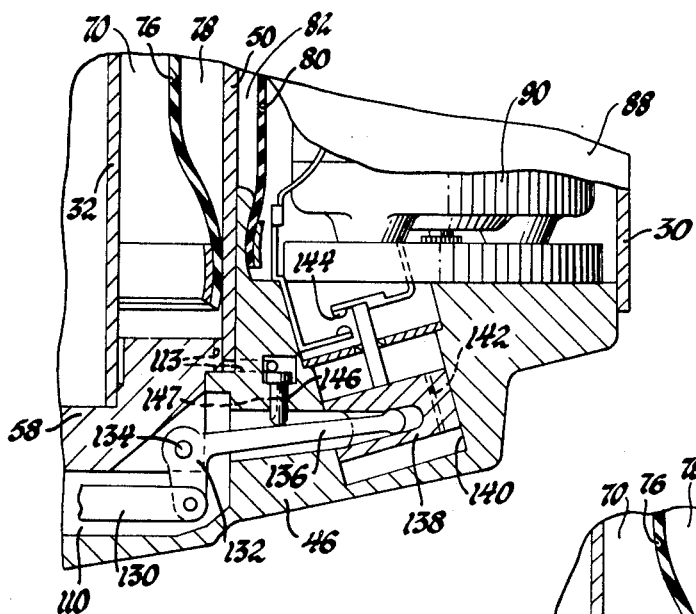
FIG. 5 is a vertical-sectioned view taken along section line 5—5 in FIG. 4.
Figure 8:
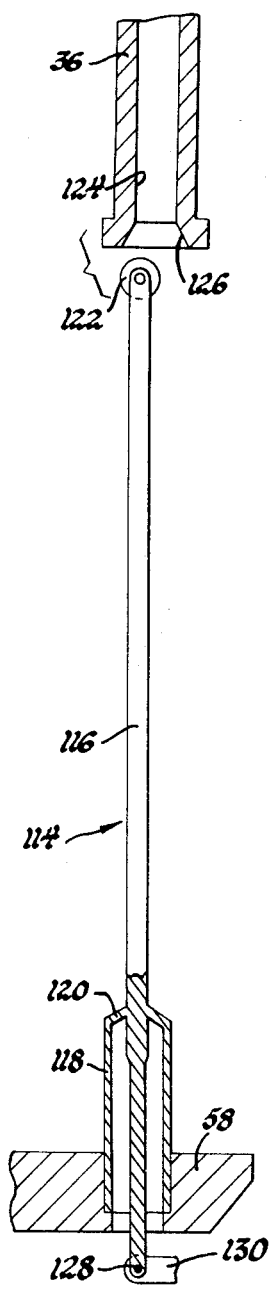
FIGS. 8, 9, 10 are fragmentary views of the height sensing device shown in its light load, normal load, and heavy load positions of operation.
Figure 9:
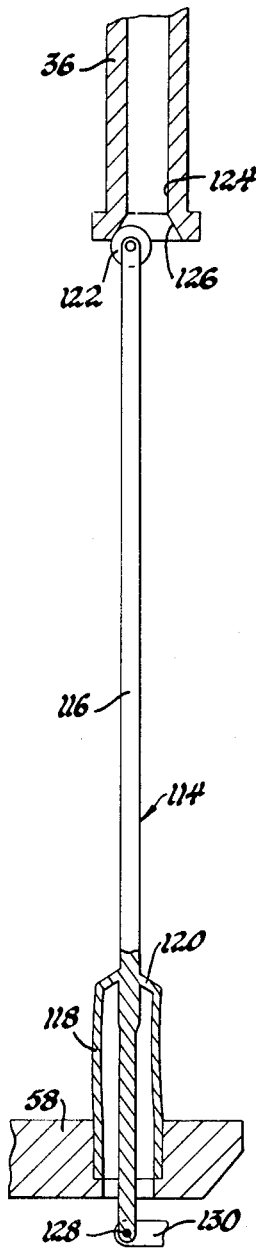
Figure 10:
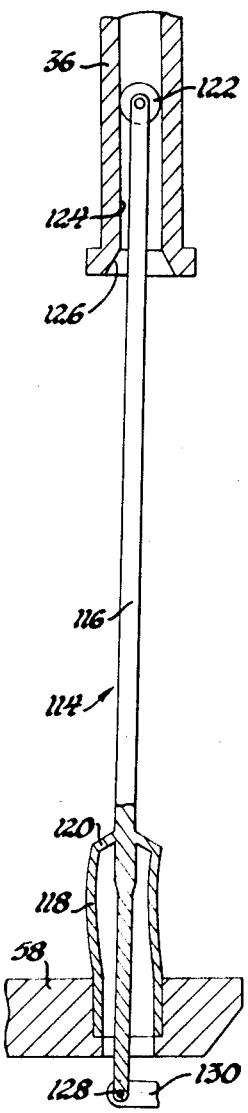

The elongation of unit 24 and the related distance between axle 12 and frame 10 of the automobile is sensed by a height-sensing device generally identified in FIG. 2 by the numeral 114 and more particularly shown in FIGS. 8, 9, 10. The height-sensing device 114 includes a cantilevered lever 116 supported at its lower end by a flexible tube 118 which permits the lever 116 to pivot laterally about the connection point 120 and serves as a hydraulic seal between chamber 64 and space 110. The upper end of lever 116 supports a roller 122 adapted to slide into a central bore 124 in piston rod 36. As lever 116 and roller 122 enter the bore 124 is piston rod 36, the lever 116 is pivoted laterally to the right by a cammed surface 126 at the entrance of bore 124. The lower end of rod 116 is connected by a pin 128 to a link 130 whose other end is connected to a pivoted lever 132 (see FIG. 5). Lever 132 is pivoted about a pin 134 on member 58. An arm 136 of lever 132 coacts with a reciprocal dampening piston 138 within a bore 140 of end cap 46. An axially directed port 142 in the piston 138 conveys hydraulic fluid between the ends of piston 138 to dampen movement of lever 132.

The height-sensing device 114 is shown in its three operative positions in FIGS. 8, 9 and 10. In FIG. 8, lever 116 and tube 118 are unstressed by the piston rod 36 which is the position for a lightly loaded automobile. In this operational position, the lower end of lever 116 is furthest to the right thus pivoting lever 132 into its most counterclockwise position. In this position, the lever 132 disconnects a switch 144 so as to deenergize motor 90. A bleed valve 146 is positioned to open a bleed passage 147 connecting the reservoir chamber 82 with the booster chamber 70 through the space 110. In this position, pressurized hydraulic fluid is bled from the booster chamber 70 into the reservoir chamber 82 to cause the piston 60 and piston rod 36 to move downward within the pressure cylinder tube 32.

In FIG. 9, roller 122 on lever 116 is shown contacting the cam surface 126 of bore 124. In this position, the rod 116 is laterally displaced and its lower end moves to the left. This places the lever 132 in a position to close the bleed valve 146. The switch 144 however remains open in this position.

In FIG. 10, the roller 122 on lever 116 is well into a bore 124 of piston rod 36. This laterally displaces the lever 116 so as to pivot its lower end to an extreme left position. This places the lever 132 clockwise to close switch 144 which energized motor 90 for operating pump 86. The resultant pressurization of hydraulic fluid increases hydraulic pressure within the compression chamber 64. This pressure acts against the cross-sectional area of the piston rod 36 to move the piston 60 upward within pressure cylinder tube 32 until roller 122 contacts the cammed surface 126 of the piston rod. In this position, lever 116 is in its center or equilibrium position with switch 144 open and the bleed valve 146 closed. The height-sensing device 114 is unaffected by high frequency movement of the piston 60 and piston rod 36 within the pressure cylinder tube 32 because of the time lag produced by dampening piston 138.

While the embodiments of the present invention as herein described constitutes a preferred form, it is to be understood that other forms may be adapted.

What is claimed is as follows:

1. An integral combination shock absorber and self-leveling unit for automotive suspension systems comprising: a member adapted to be connected to the unsprung mass of the automobile; said member having a hydraulic fluid-filled pressure cylinder tube within its interior; a piston rod connected at one end to the sprung mass of the automobile; said piston rod extending through said member coaxially into said pressure cylinder tube; a valved piston on the other end of said piston rod for reciprocation within said pressure cylinder tube to dampen relative movement between said sprung and unsprung masses of the automobile; said piston dividing said pressure cylinder tube into a fluid-filled rebound chamber and a fluid-filled compression chamber; a booster chamber containing hydraulic fluid and fluidly connected to said compression chamber for supplying and receiving hydraulic fluid from said compression chamber as said piston moves upward and downward respectively in said pressure cylinder tube; a reservoir chamber for storing hydraulic fluid; an electric motor-driven fluid pump for drawing fluid from said reservoir chamber, pressurizing the fluid and transferring the pressurized fluid to said compression chamber whereby it produces an upward force upon the cross-sectional area of said piston rod; a height-sensing means responsive to the location of said piston within said pressure cylinder tube for energizing said electric pump motor whenever said piston is less than a predetermined distance from the bottom of said pressure cylinder tube; a bleed valve which is normally closed to prevent hydraulic fluid flow between said booster chamber and said reservoir chamber and which is opened by said height-sensing means whenever said piston is more than another predetermined distance from the bottom of said pressure cylinder tube.

2. An integral combination shock absorber and self-leveling unit for automotive suspension systems comprising: a member adapted to be connected to the unsprung mass of the automobile; said member having a hydraulic fluid-filled pressure cylinder tube within its interior; a piston rod connected at one end to the sprung mass of the automobile; said piston rod extending through said member coaxially into said pressure cylinder tube; a valved piston on the other end of said piston rod for reciprocation within said pressure cylinder tube to dampen relative movement between said sprung and unsprung masses of the automobile; said piston dividing said pressure cylinder tube into a fluid-filled rebound chamber and a fluid-filled compression chamber; a booster chamber containing hydraulic fluid and fluidly connected to said compression chamber for supplying and receiving hydraulic fluid from said compression chamber as said piston moves upward and downward respectively in said pressure cylinder tube; a reservoir chamber for storing hydraulic fluid; an electric motor-driven fluid pump for drawing fluid from said reservoir chamber, pressurizing the fluid and transferring the pressurized fluid to said compression chamber whereby it produces an upward force on the cross-sectional area of the piston rod; a height-sensing means responsive to the location of said piston within said pressure cylinder tube for energizing said electric pump motor whenever said piston is less than a predetermined distance from the bottom of said pressure cylinder tube; a bleed valve which is normally closed to prevent hydraulic fluid flow between said booster chamber and said reservoir chamber and which is opened by said height-sensing means whenever said piston is more than another predetermined distance from the bottom of said pressure cylinder tube; said height-sensing means including a lever pivotally connected to said shock absorber member and extending axially upward into said pressure cylinder tube; an axial bore in said piston rod having a cammed end surface inclined with respect to the axis of the piston rod and adapted to contact and laterally displace the upper end of said lever as the piston rod moves downward within said pressure cylinder tube; a flexible tube attached at its lower end to said shock absorber member and attached at its upper end to said lever thereby acting as a hinge to permit pivotal movement of said lever with respect to said shock absorber member.

3. In a direct-acting hydraulic shock absorber having an interconnected piston and piston rod reciprocal in a pressure cylinder tube and a hydraulic fluid filled compression chamber and reservoir chamber: a height-sensing means for sensing the relative location of said piston in said pressure cylinder tube; said means including a pivotally mounted lever which extends axially upward into said pressure cylinder tube; an axial bore in said piston rod having a cammed end surface inclined with respect to the axis of said piston rod and adapted to contact and laterally displace the upper end of said lever as said piston rod moves downward within said pressure cylinder tube; a flexible tube attached at its lower end to said shock absorber and attached at its upper end to said lever thereby acting as a hinge to permit pivotal movement of said lever with respect to said shock absorber and further acting as a seal between said compression chamber and said reservoir chamber.

* * * * *